UNITED STATES PATENT OFFICE.

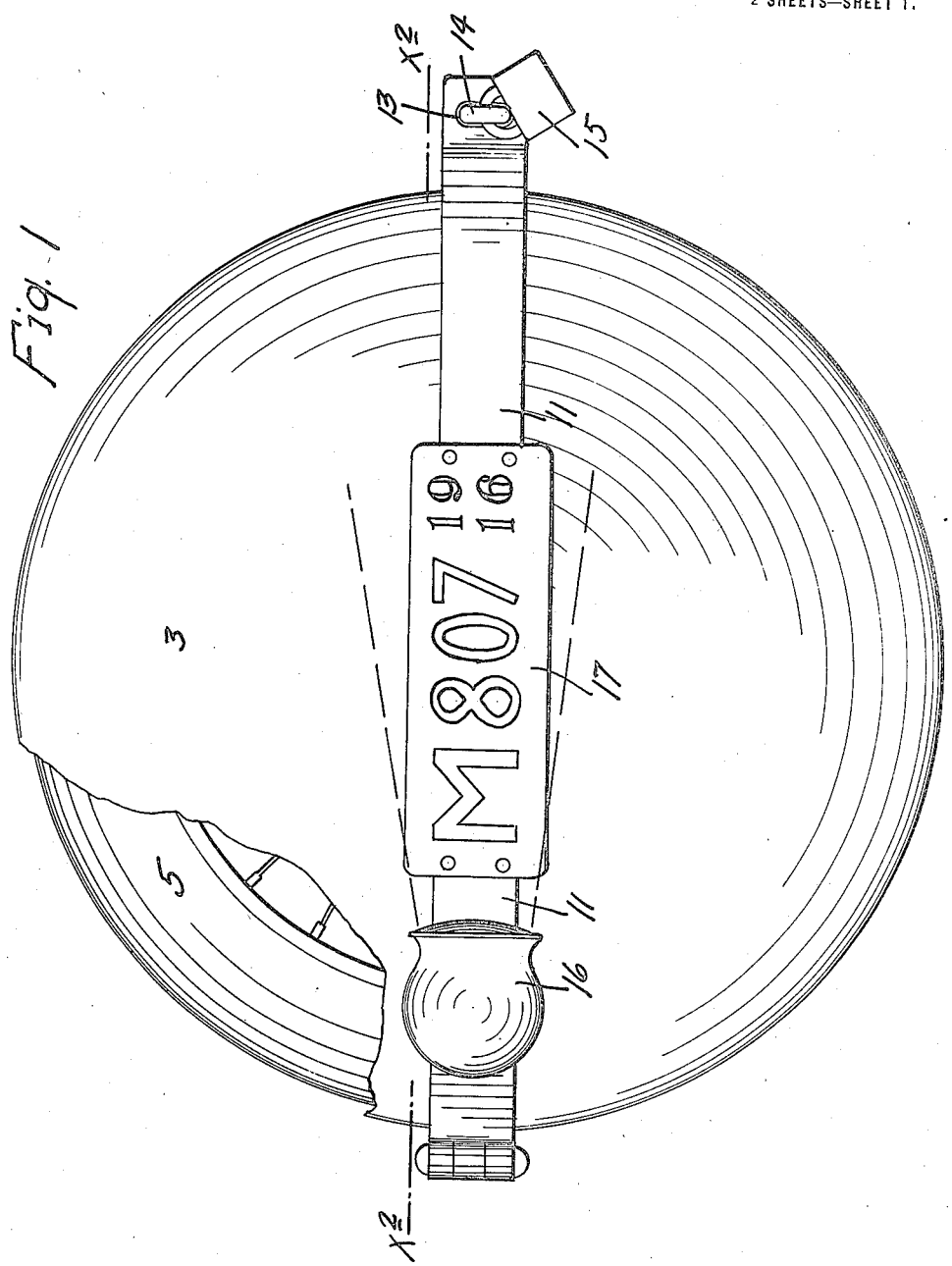

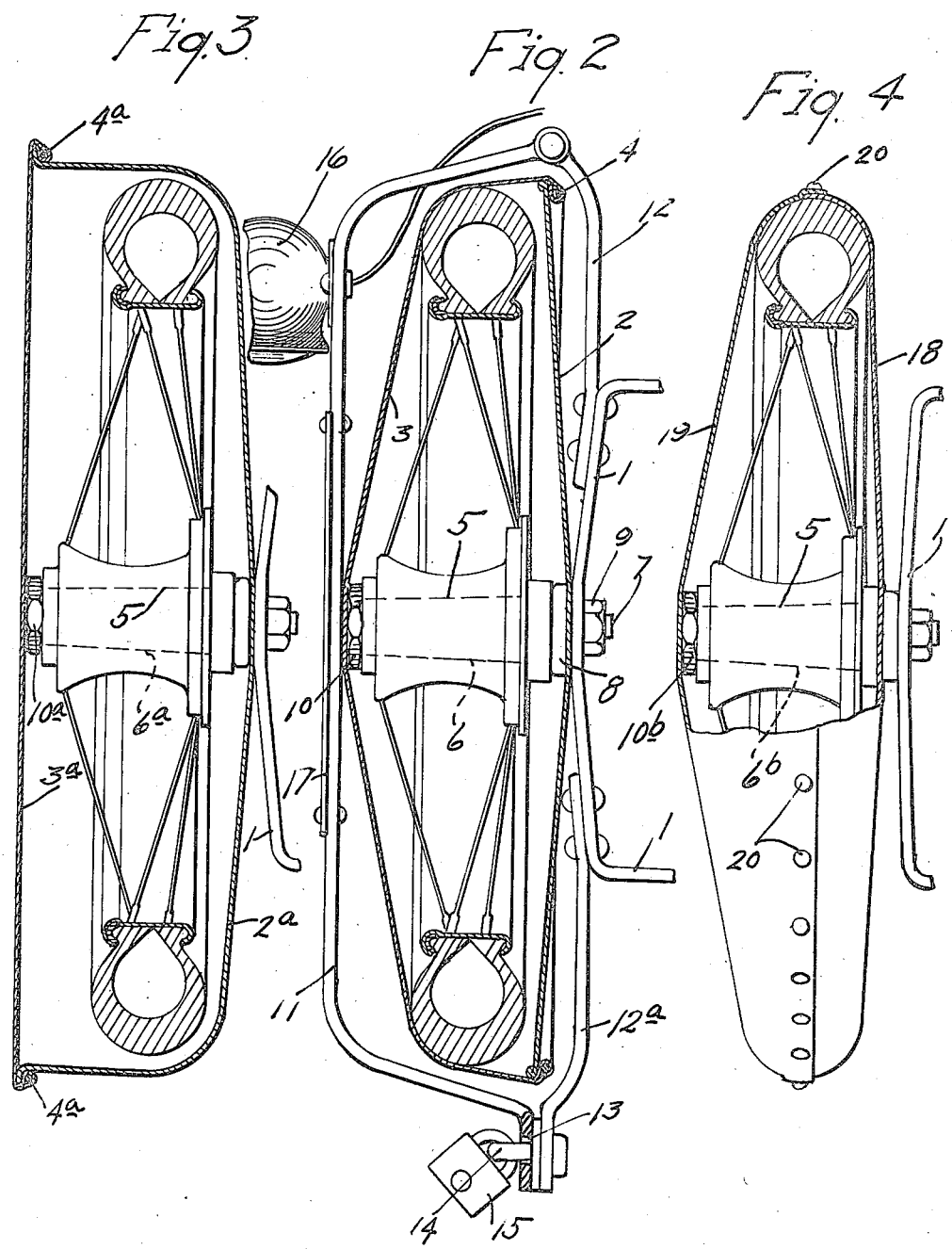

EMIL R. DRAVER, OF RICHMOND, INDIANA.

WHEEL CARRIER AND RECEPTACLE.

1,321,017.  Specification of Letters Patent.  Patented Nov. 4, 1919.

Application filed May 6, 1916. Serial No. 95,761.

*To all whom it may concern:*

Be it known that I, EMIL R. DRAVER, a citizen of the United States, residing at Richmond, in the county of Wayne and State of Indiana, have invented certain new and useful Improvements in Wheel Carriers and Receptacles; and I do hereby declare the following to be a full, clear, and exact description of the invention, such as will enable others skilled in the art to which it appertains to make and use the same.

My invention has for its object to provide a simple and highly efficient carrier and receptacle for use in connection with automobiles especially adapted for protecting and carrying an extra pneumatic tire, whether on a demountable rim or on the rim of an extra wheel, and to such ends, generally stated, the invention consists of the novel devices and combinations of devices hereinafter described and defined in the claims.

Particularly, however, the invention is designed to carry an extra or fifth tire equipped wheel, and in the drawings, the invention is shown as especially designed for this particular purpose. In the said drawings which illustrate the invention, like characters indicate like parts throughout the several views.

Referring to the drawings:

Figure 1 is a rear elevation with some parts broken away, showing the improved tire carrier and receptacle;

Fig. 2 is a horizontal section taken approximately on the line $x^2$ $x^2$ of Fig. 1;

Fig. 3 is a view corresponding to Fig. 2, but illustrating a modified construction; and Fig. 4 is a view corresponding to Fig. 2 but illustrating a still further modified construction, and some parts being shown in full plan view.

Referring first to the construction illustrated in Figs. 1 and 2, the numeral 1 indicates a yoke-like support, which, in practice, will be rigidly secured to a suitable part of the running gear or body of an automobile, preferably at the rear thereof. In the construction here illustrated, the so-called receptacle is made up of a slightly conical sheet metal back plate 2 and a flexible cover 3, which latter is provided with an endless elastic clamping band 4, such, for example,
as that disclosed in my pending applica-
tion S. N. 39,146, filed of date, July 10, 1915, entitled "Combined tire carrier and cover", and which application will mature into U. S. patent on May 16th, 1916.

The cover, when applied, will be held to the back plate 2 by contraction of the elastic clamping band 4 and the flexible marginal edge of said cover, over the edge of said back plate.

In the drawings, an ordinary tire-equipped wire wheel is indicated as an entirety by the numeral 5. For supporting a wheel of this character, or of any other character, for that matter, from the support 1, and within the receptacle, a spindle 6 is projected axially from the back plate 2 and from the support 1. Preferably, the spindle 6 is provided with a reduced tread gudgeon 7 that is passed through the back plate 2 and supporting yoke 1, and it is further formed with a clamping flange 8 seated against the said back plate. On the gudgeon 7 is a nut 9, which, when tightened, clamps the back plate and yoke together and rigidly secures the spindle 6 to both thereof. On its outer end, the spindle 6 is shown as provided with a nut 10 for detachably holding the wheel on the spindle. As a means for locking the wheel on the spindle, I provide a metallic lock bar or strap 11, which, at one end, is pivoted to a rigid metal arm 12 projected from one side of the supporting yoke 1. The free end of the said lock bar 11 has a perforation 13 adapting it to be passed over a lock lug 14 rigidly secured to the projecting end of a metal arm 12$^a$ that is usually rigidly secured to the said supporting yoke 1. By means of a pad-lock 15 applied to the lock lug 14, a lock bar 11 may be secured in the position shown in Fig. 2, and in this position of the lock bar, it is impossible to remove the wheel 5 from the spindle 6, even if the nut 10 were not provided.

The lock bar 11 also affords a convenient device for supporting a tail lamp 16 and number plate 17.

In the construction illustrated in Fig. 3, the back plate 2$^a$ has a marginal portion that projects outward beyond the outer end of the hub of the wheel 5, and the cover 3$^a$, in this instance, is in the form of a flat flexible disk, or at least a disk having a flexible marginal portion, provided with an endless elastic clamping band 4$^a$ adapted to be sprung over the out-turned edge flange of the said back plate. The spindle 6ᵃ is applied to the back plate and supporting yoke 1 in the same manner as described in connection with Figs. 1 and 2. As shown, the spindle 6ᵃ is provided with a nut 10ᵃ for holding the wheel on said spindle.

In the construction illustrated in Fig. 4, the supporting yoke 1 has a wheel supporting spindle 6ᵇ for the wheel 5 and is preferably secured to the said yoke, substantially as herebefore described. As shown, the spindle 6ᵇ is provided with a nut 10ᵇ for holding the wheel on said spindle. In this construction, the tire receptacle is made up of two flexible members 18 and 19. The said member 18, which forms the back plate of the receptacle, is axially secured to the spindle 6ᵇ and the marginal edges of the two sections 18 and 19 are adapted to be overlapped on the outer portion of the wheel tire, and to be detachably connected by suitable fastening devices, such as snap buttons 20.

In my prior application above identified, I have shown and claimed the combined tire carrier and cover which is adapted to carry a tire-equipped demountable rim. The receptacle of the present device is adapted to contain and completely inclose, either a complete wheel or a rim and tire, and both the so-called back plate and the so-called cover extended from the axis of the wheel or rim, outward and around the same. In the forms of the device shown in Figs. 3 and 4, the so-called lock bar is not shown, but, of course, might be employed either in the same or similar arrangement as that shown in Figs. 1 and 2. The back plate of the wheel receptacle is preferably made slightly conical because that form gives strength and rigidity thereto, but, nevertheless, it might be a flat member. In vertical section at a right angle to the axis of the wheel, the receptacle should be rounded and the line of separation between the back plate and cover should be circumferential thereof, and on a line outward of the tread surface of the tire, so that when the cover is removed from the back plate, the tire will clear the back plate when the rim or wheel is moved laterally.

The wheel supporting spindle, it will be understood, is, in a broad sense, a hub-engaging device, and this hub engaging device is adapted to support a wheel independently of the tire-inclosing receptacle. This is important because the same wheel may, at different times, have tires of different diameter, and moreover, the diameter of a smooth faced and non-skidding tire, will vary even in a tire of a given dimension, and such wheel should be held against wabbling or jumping-around movements within an inclosing receptacle, both to prevent noise and to prevent wearing of the tire, or to properly hold the wheel even when the tire is not applied thereto.

The bar detachably extended across the exposed face of the cover of the wheel inclosing receptacle performs several important functions, to-wit, it serves as a guard to protect the cover and the wheel inclosed in the receptacle. It serves as a convenient support for a tail light and a number plate, and when the hub-engaging device is used in the receptacle, it prevents removal of the wheel from such hub-engaging device as long as the said bar is in working position.

What I claim is:

1. In a device of the kind described, the combination with a suitably supported back plate, of a flexible cover detachably applied to the perimeter thereof, and coöperating therewith to form a complete inclosing receptacle, and having an axial spindle adapted to support a tire equipped wheel within said receptacle.

2. The combination with a wheel inclosing receptacle, of a relatively stationary hub-engaging device centrally located therein and arranged to support a wheel independently of said inclosing receptacle, the said inclosing receptacle having a removable cover, and a bar detachably supported independently of said removable cover, and when in working position extending across the exposed face thereof and capable of movement independently of said cover.

3. In a device of the kind described, the combination with a support and a back plate secured thereto, of a cover detachably secured to said back plate and coöperating therewith to form a complete receptacle, a wheel supporting spindle extending from the back plate and projecting axially into said receptacle, and a lock bar movably secured to the support, and when in working position, serving to hold a wheel on said spindle.

4. In a device of the kind described, the combination with a support and a back plate secured thereto, of a cover detachably secured to said back plate and coöperating therewith to form a complete receptacle, a wheel supporting spindle extending from the back plate and projecting axially into said receptacle, a lock bar hinged at one end to said support, and a lock device for locking the other end of said lock bar to said support, said lock bar, when in a locked position, serving to hold the wheel against removal from said spindle.

5. In a device of the kind described, the combination with a support and a rigid concavo-convex metal back plate secured thereto, of a flexible cover detachably securable to the perimeter of said back plate and coöperating therewith to form a complete receptacle, and a wheel supporting spindle centrally secured to said back plate and projecting into said receptacle and adapted to support a tire equipped wheel within said receptacle.

6. In a device of the kind described, the combination with a support and a back plate secured thereto, of a cover detachably secured to said back plate and coöperating therewith to form a complete receptacle, a wheel supporting spindle extending from the back plate and projecting axially into the receptacle, and means for retaining the wheel on the spindle.

7. In a device of the kind described, the combination with a support attached to the body or chassis of an automobile and a back plate secured thereto, of a cover detachably secured in position and coöperating with the back plate to form a complete receptacle, a wheel supporting spindle extending from the back plate and projecting axially into the receptacle, and means for retaining the wheel on the spindle.

In testimony whereof I affix my signature in presence of two witnesses.

EMIL R. DRAVER.

Witnesses:
ORRIN DRAVER,
R. E. DRAVER.